United States Patent
Ritchey et al.

(10) Patent No.: US 11,057,433 B2
(45) Date of Patent: Jul. 6, 2021

(54) SYSTEM FOR AND METHOD OF DETERMINING DATA CONNECTIONS BETWEEN SOFTWARE APPLICATIONS

(71) Applicant: JPMorgan Chase Bank, N.A., New York, NY (US)

(72) Inventors: Ronald W. Ritchey, Centreville, VA (US); Ta-Wei Chen, Princeton Junction, NJ (US); Khanh Tran, Jersey City, NJ (US); David Laurance, Dobbs Ferry, NY (US); Cedric Ken Wimberley, San Rafael, CA (US); Parthasarathi Chakraborty, Jersey City, NY (US); Aradhna Chetal, Renton, WA (US); Donald B. Roberts, Delaware, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 184 days.

(21) Appl. No.: 16/051,660

(22) Filed: Aug. 1, 2018

(65) Prior Publication Data
US 2020/0045081 A1    Feb. 6, 2020

(51) Int. Cl.
*H04L 29/06* (2006.01)
(52) U.S. Cl.
CPC .......... *H04L 63/20* (2013.01); *H04L 63/0263* (2013.01); *H04L 63/107* (2013.01)
(58) Field of Classification Search
CPC .... H04L 63/20; H04L 63/107; H04L 63/0263
See application file for complete search history.

(56) References Cited

U.S. PATENT DOCUMENTS

| | | | | |
|---|---|---|---|---|
| 2011/0247074 A1* | 10/2011 | Manring | ................. | G06F 21/57 726/26 |
| 2011/0321150 A1* | 12/2011 | Gluck | ................. | H04L 63/0245 726/11 |
| 2014/0007048 A1* | 1/2014 | Qureshi | ............ | H04W 12/0806 717/110 |
| 2015/0007251 A1* | 1/2015 | Johns | .................... | H04L 63/168 726/1 |
| 2017/0279770 A1* | 9/2017 | Woolward | .......... | H04L 63/0263 |

OTHER PUBLICATIONS

International Search Report in corresponding International Application No. PCT/US19/44519, dated Oct. 25, 2019.

\* cited by examiner

*Primary Examiner* — Farid Homayounmehr
*Assistant Examiner* — Suman Debnath
(74) *Attorney, Agent, or Firm* — Greenblum & Bernstein, P.L.C.

(57) ABSTRACT

A system for and a method of regulating the data interconnections between applications running on an infrastructure are provided. The system/method records access permission data into metadata embedded in the source code of each such application that regulates the data that can be received or transmitted by that application. In addition to regulating the receipt or transmission of data, the metadata can serve to provide instruction to firewalls and other regulating systems in order to configure those systems to allow the applications to receive and transmit data for which permissions have been recorded.

18 Claims, 11 Drawing Sheets

Example #1: Global policy expression

"A production application can only communicate with other production applications."

```
{
  "Scope":
  {
    "Environment":["PROD", "BCP", "DR"]
  },
  "Condition":
  {
    "notEqual":("out.application.environment",{"UAT","QA","DEV","LAB"}),
    "notEqual":("in.application.environment",{"UAT","QA","DEV","LAB"})
  },
  "Effect": "Allow",
  "Action": ""
}
```

Example #2: Global policy expression

"Desktop can connect to all environments, except other desktop and Lab environment, only on port 443 & 8443."

```
{
  "Scope":
  {
    "Environment":{"DESKTOP"}
  }
  "Condition":
  {
    "notEqual":{"out.application.environment":{"DESKTOP","LAB"}},
    "notEqual":{"in.application.environment":{"DESKTOP","LAB"}},
    "Equal":{out.dst_port":{"443", "8443"}}
  }
  "Effect": "Allow"
  "Action": ""
}
```

SYSTEM FOR AND METHOD OF DETERMINING DATA CONNECTIONS BETWEEN SOFTWARE APPLICATIONS

FIELD

The present invention relates generally to a system for and a method of determining data connections between software applications as those applications are built rather than after their complete deployment.

BACKGROUND

Software applications very rarely run in isolation. In fact, software applications, particularly applications that process data from diverse sources, may receive and send data to dozens of different locations throughout a series of connected resources. If the application code is operating as intended, this interaction doesn't generally cause problems. However, should the application fail to operate as intended or if other applications with which the application interacts fail, the result may be data corruption or erroneous results. The impact of corrupt data or erroneous results that are relied on to the detriment of an organization can be costly. Current methods of tracking interactions between applications involve adding intended data connections into program requirements documents and test plans. These amount to intentions rather than results as coding errors or unintended program operation can cause connections to break or perform in an unexpected manner. Thus, existing methods of documenting connections between applications can result in lack of visibility to actual connections, the inability to trace connection issues and the inability to validate interconnections in an application that has been introduced into production. What is needed is a system for and a method of defining application connectivity in such a way that it is self-regulating.

SUMMARY

In exemplary embodiments, connectivity between an application and other applications or data sources is encoded in the source code (source code, object code, scripts, interpreted code, and the like) such that these relationships are defined and can be used to automatically generate connectivity maps. This allows information flow to be reliably mapped without having to manually create maps that may not accurately reflect the actual operating characteristics of the application when in production use.

In some exemplary embodiments, the connectivity requirements are defined in programming documentation as is normally the case. However, these definitions are then also coded into the source code by the programmer. These coded definitions serve to allow for the automated creation of information flow maps. In exemplary embodiments, the coding is located in metadata (e.g., environmental labels) associated with an application. In some exemplary embodiments, the automated creation of flow maps results in data that can be readily compared to actual application connections in order to detect discrepancies that could indicate errors in the operation of the application or its environment. The connectivity requirements serve to indicate what sort of resources the application may consume and also what data should be expected to be published by the application when it is functioning normally.

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concept will become better understood with regard to the following description and accompanying drawings in which.

DETAILED DESCRIPTION

Figure 1:
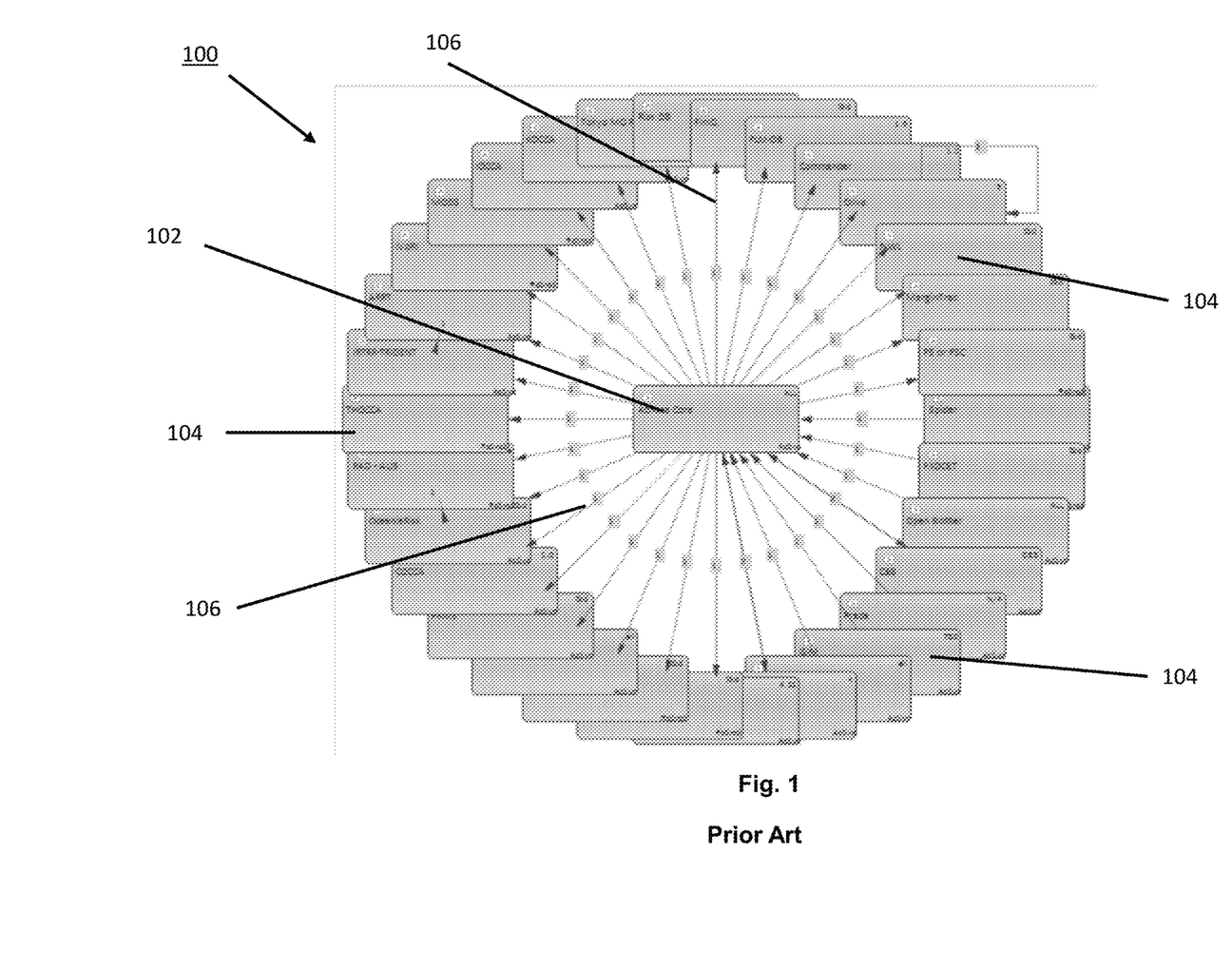
FIG. 1 is a diagram of a connectivity map illustrating the interconnections between various applications.

A connectivity map 100 is illustrated in FIG. 1. As shown, an application 102 may be connected to a plurality of other applications or data sources 104. The connectivity map serves to illustrate this connection in a graphical manner that is easily interpreted by a human being. Alternatively, a connectivity map 100 may be comprised of electronic data that can be consumed by system monitoring and provisioning systems to better understand the characteristics of applications running on the particular data system. In the connectivity map 100, the connections 106 between the application 102 and other applications or data sources 104 are illustrated as arrows. Known approaches to creating such a map involve a manual review of the documented connections between an application and its data sources or recipients. As one of ordinary skill in the art would understand, such a manual process may not necessarily accurately reflect the actual connections of code as implemented. As such, each time a new application or resource is deployed, a new map must be created if an accurate understanding of the application's connections is desired.

Figure 2:
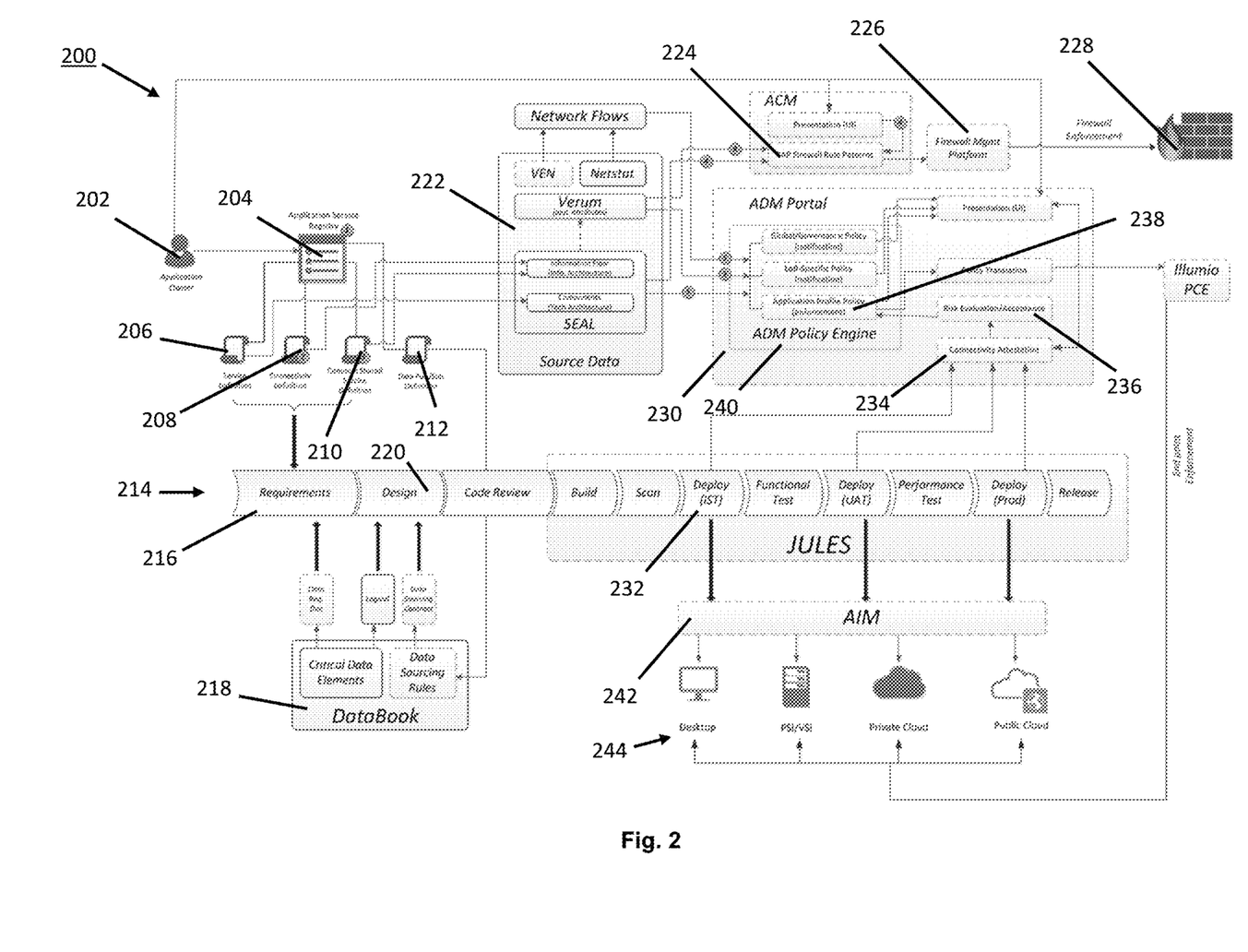
FIG. 2 is a system diagram illustrating the various systems and data flows in an exemplary embodiment.
Figure 3:
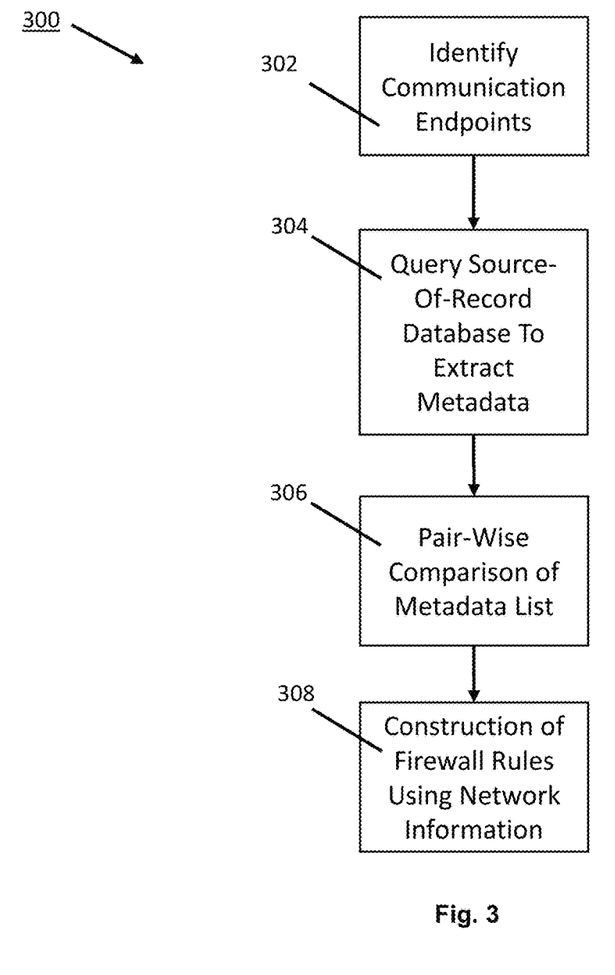
FIG. 3 is a flow chart illustrating the steps of creating firewall rules from metadata in an exemplary embodiment.

In an exemplary embodiment, the connectivity is defined by the application developer. As illustrated in the flow diagram 200 of FIG. 2, the application owner 202 enters application data into the application service registry 204. This information comprises service definitions 206, connectivity definitions 208, common shared service definitions 210, and data publication/subscription definitions 212. This information is used to create application requirements 216 which are part of the software development timeline 214 illustrated in FIG. 2. In combination with other information, these definitions are used to create an application databook 218 which is used to generate further requirements and design information for the requirements 216 and design 220 portions of the software development timeline 214. A source data repository 222 collects data on service definitions 206, connectivity definitions 208, and common shared service definitions 210 and provides that data to a firewall rule patterns manager 224 and an application deployment manager 230. The firewall rules pattern manager 224 uses the various definition files in order to establish firewall enforcement settings 228 for deployment at one or more firewalls using a firewall management platform 226. In an exemplary embodiment, a representational state transfer application program interface (REST API) is used, then a set of firewall rules is applied. In certain exemplary embodiments, these rules consist of a 5-tuple (source IP address, destination IP address, source port, destination port, and protocol). The rules can be embedded in either HTTP POST method (creating a new firewall rule), HTTP PUT method (modifying a firewall rule), or HTTP DELETE method (deleting a firewall rule) to update the database in the firewall management platform 226. Subsequently, the firewall management platform 226 will push the updated rules to the target firewall devices. This arrangement enables the firewall rule patterns manager 224 to automatically configure the firewall enforcement settings 228 to accommodate the connections and data flows required by the application. FIG. 3 illustrates the steps involved in a method 300 of automatically deriving firewall rules from metadata. In step 302, the communication endpoints are identified. In an exemplary embodiment, a communication endpoint could be an application, a virtual or physical server IP address, a container in a Cloud, or even a microservice with identification. In step 304, the source-of-record database is queried to extract a list of metadata associated with each communication endpoint. Metadata extracted in this step contains two sets of information, a list of information that allows connectivity policy decision making (e.g., environmental variables such as 'Production' or 'Non-production', geo-location information such as country codes—'US', 'Geneva', 'Russia', etc., confidentiality tagging such as "highly confidential", "confidential", etc., regulatory and compliance tagging such as SOX, etc., and list of network identifiers (e.g., IP addresses, subnet addresses, etc.). In step 306, a pair-wise comparison is performed on the meta-data list that are relevant to policy decision making between two end points. This comparison is processed by a policy engine to derive a permit or a deny result. For example, Application-1 and Application-2 contains the following meta-data list: Application-1: {"production", "US"}, Application-2: {"non-production", "US"} In this example, a global policy disallows communication between non-production assets and production assets. Thus, the policy engine will determine that the global policy will deny the communication between the two applications. In another example, Application 1 contains the following meta-data list: {"production", "US"}, while Application 2 contains the following meta-data list: {"production", "Geneva"}. In this example, although both applications are valid production apps, Geneva has strict data-residency rule and, as a result, the policy doesn't allow data flowing across country boundaries, thus the communication will yield Deny. In a third example, Application-1: {"non-production", "Russia", "public"} and Application-2: {"non-production", "Russia", "public"} have identical sets of meta-data and therefor the communication is "Permit."

Once the policy engine produces either 'Permit' or 'Deny' for any given communication pair, network info (e.g., IP addresses) associated with each communication end point is used in step 308 to construct 5-tuple firewall rules. In an exemplary embodiment, these firewall rules are sent via API calls to a firewall management platform for downstream processing.

In addition to the firewall rules pattern manager 224, in an exemplary embodiment, an application deployment manager (ADM) 230 receives connectivity and service definition data from the source data repository 222. This data is used to generate application policy data that is used to introduce the application into a production environment. As is illustrated by the software development timeline 214, the ADM 230 also receives data from various stages of software deployments, ranging, for example, from pre-production 232, user acceptance testing, and production deployment. This data is provided to a connectivity attestation function 234 of the ADM 230. This function is used to conduct a risk evaluation and acceptance test 236 and provide this data to the ADM application profile policy enforcement portion 238 of the ADM policy engine 240. This process allows the ADM 230 to evaluate the connections that are present in the software as it progresses along the software development timeline 214. Thus, in addition to defining connectivity, information from the application owner 202 stored in the source data repository 222 can also be used to automatically verify connectivity characteristics of the software during development and also to establish firewall rules and deployment policy.

Figure 4A:
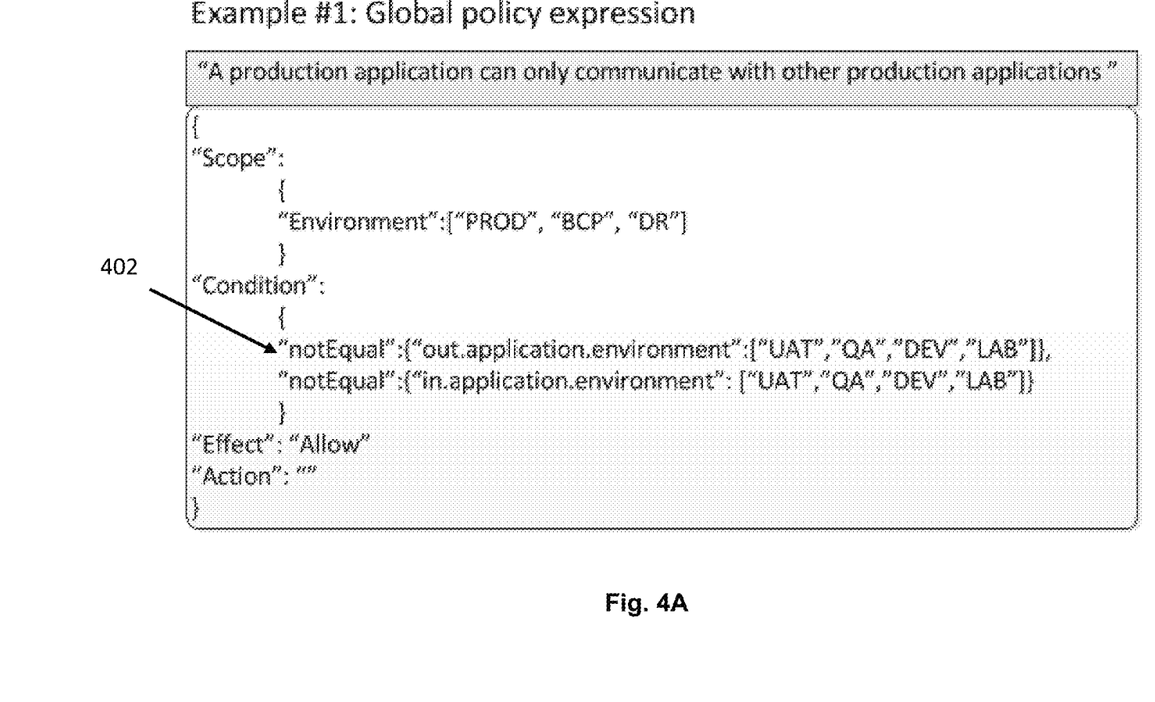
FIGS. 4A-4C are listings of computer code illustrating metadata that functions to control interconnections, according to exemplary embodiments.
Figure 4B:
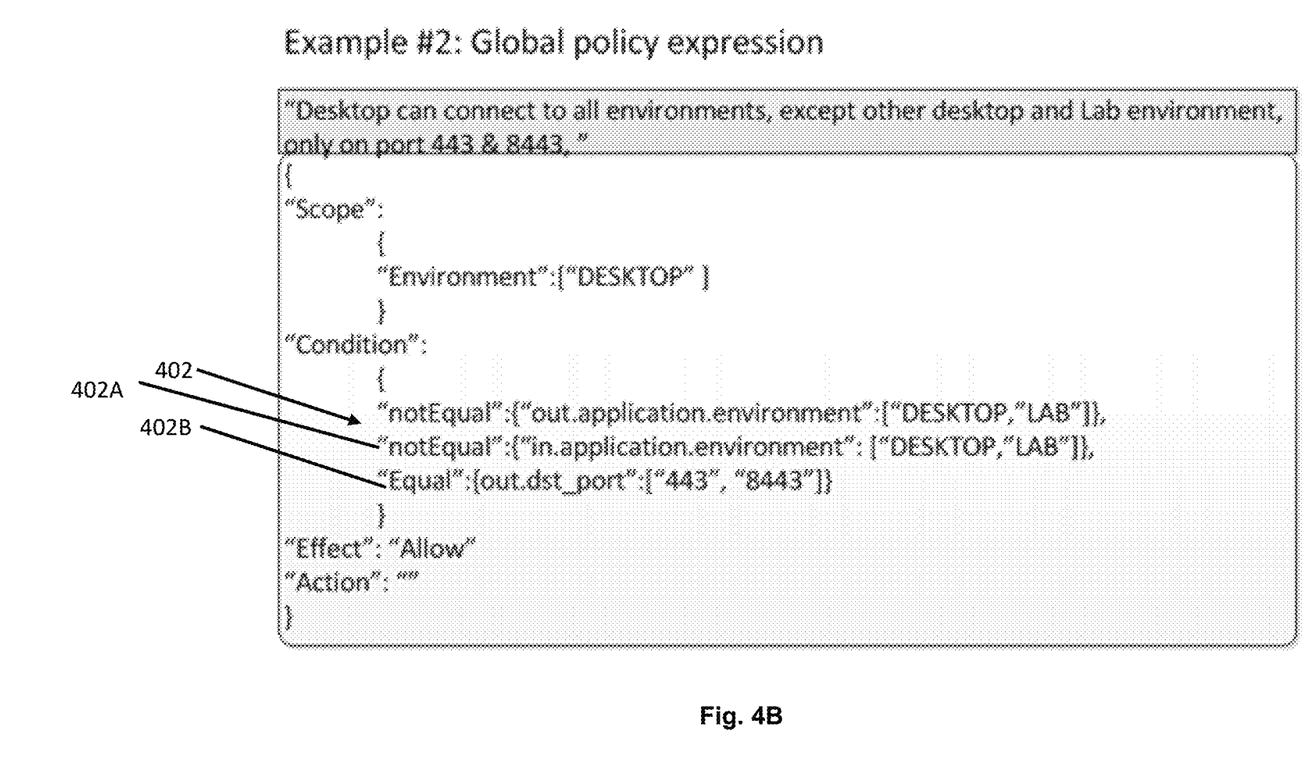
Figure 4C:
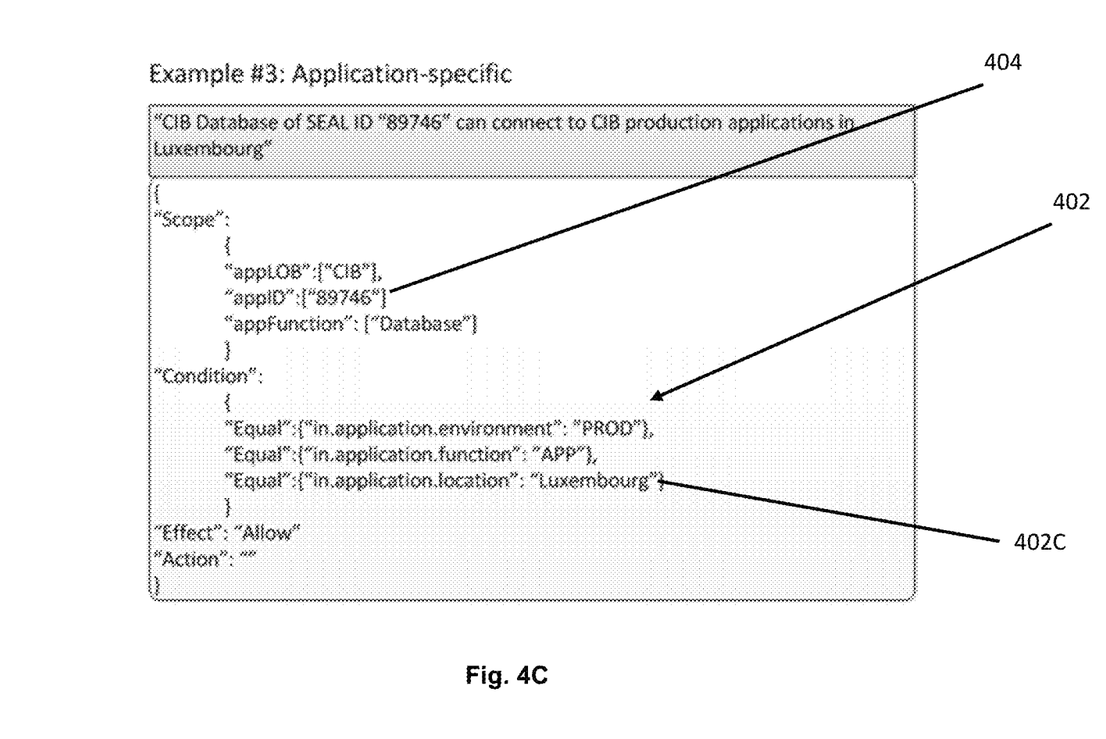

As was described in FIG. 2, the application owner 202 enters application data into the application service registry. This information is also incorporated into the source code of an application as metadata, some examples of which are shown in FIGS. 4A-4C. As illustrated, a portion of code 402A, 402B, and 402C defines the allowed connections of the complete code. For example, in FIG. 4A, the code portion 402 functions to allow only communication with applications in the production region of the operating environment. In FIG. 4B, the code portion 402A prevents the production code from communicating with desktop applications in the LAB environment. In addition, this example comprises a port restriction definition at 402B. In FIG. 4C, the code portion 402C permits the data source defined in 404 to communicate with the production applications located in Luxembourg. As can be observed by these examples, codes that define connectivity can be very specific in their limitations. This allows the application developer to exercise a great deal of control over the operation of a piece of application code.

The connectivity of the application is thus defined in the source code. In some exemplary embodiments, the only connections that can occur are those defined and permitted by the code. For example, in an exemplary embodiment, only the data sources and data consumers that satisfy a certain set of predefined conditions will be allowed to connect to the application. This was illustrated in FIGS. 4A-4C which limited the connections to certain applications, certain software operation regions, system types, and geographic regions. Thus, one of ordinary skill in the art will understand that various combinations of such limitations can result in very specific constraints on the connectivity of a piece of software application code. Additionally, because the constraints are coded into the application, changes to the connections of the application require that the code be modified and published as a new or revised version of an application. As a result, such changes are readily tracked by version control systems, providing a means to track connectivity changes.

Figure 5:
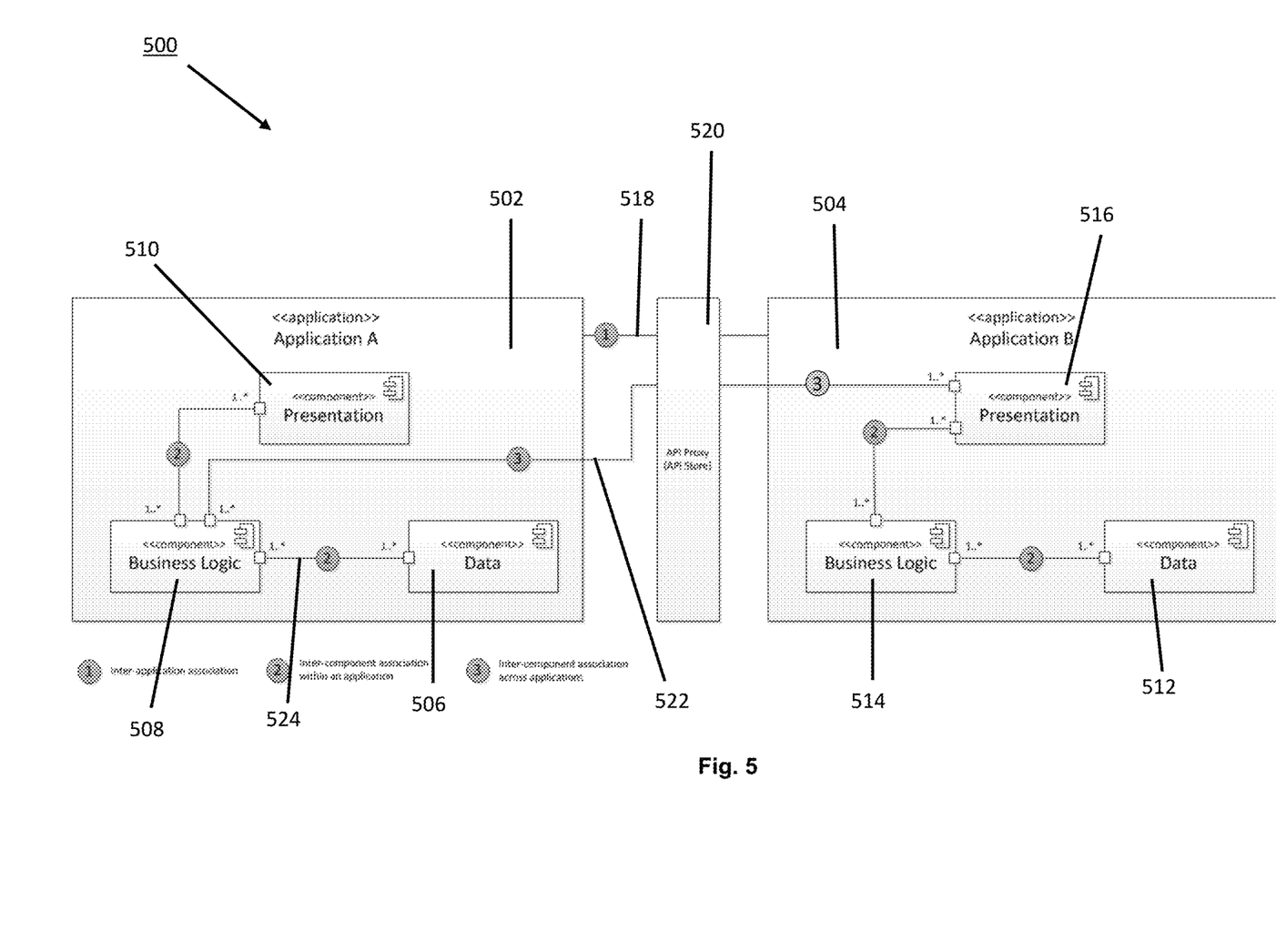
FIG. 5 is an illustration of two applications and their interconnections, according to an exemplary embodiment.

The concept of controlled connectivity is illustrated in the simplified application communication connection example 500 of FIG. 5, wherein a first application 502 is in communication with a second application 504. As is illustrated, the first application 502 has a data component 506, a logic component 508, and a presentation component 510. The second application 504 also has a data component 512, a logic component 514, and a presentation component 516. While the term "presentation" is used, these components should be thought of as data interfaces for the output of the logic components 508 and 514. As is illustrated by the interconnection 518, these two applications are associated with each other through an application program interface (API) proxy 520. As is illustrated at 522, a connection exists in this exemplary embodiment between the business logic of the first application 502 and the presentation component 516 of the second application 504. In an exemplary embodiment, this connection is encoded in the metadata of at least the first application 502. For example, the encoding may regulate the type of data that is retrieved by the logic components 508 and may restrict that data to such data as is provided by the presentation component 516 of the second application 504. In addition to this external connection 522, internal connections exist within the first application 502 (it should be noted that internal connections generally exist in most applications). As illustrated, a connection 524 exists between the logic component 508 and the data component 506. In an exemplary embodiment, this connection 524 may be regulated by a definition found in metadata associated with the first application 502. As such, only certain data types may be allowed to flow into the logic component 508 and, perhaps even more importantly, only certain data may be permitted to flow from the logic component 508 to the data component 506. This restriction may be used to prevent unintended data from entering the data component 506 in an attempt to avoid corruption of data stored in the data component 506. In a similar manner, in certain exemplary embodiments, the connection between the logic component 508 and the presentation component 510 can be controlled by limitations stored in metadata.

Figure 6:
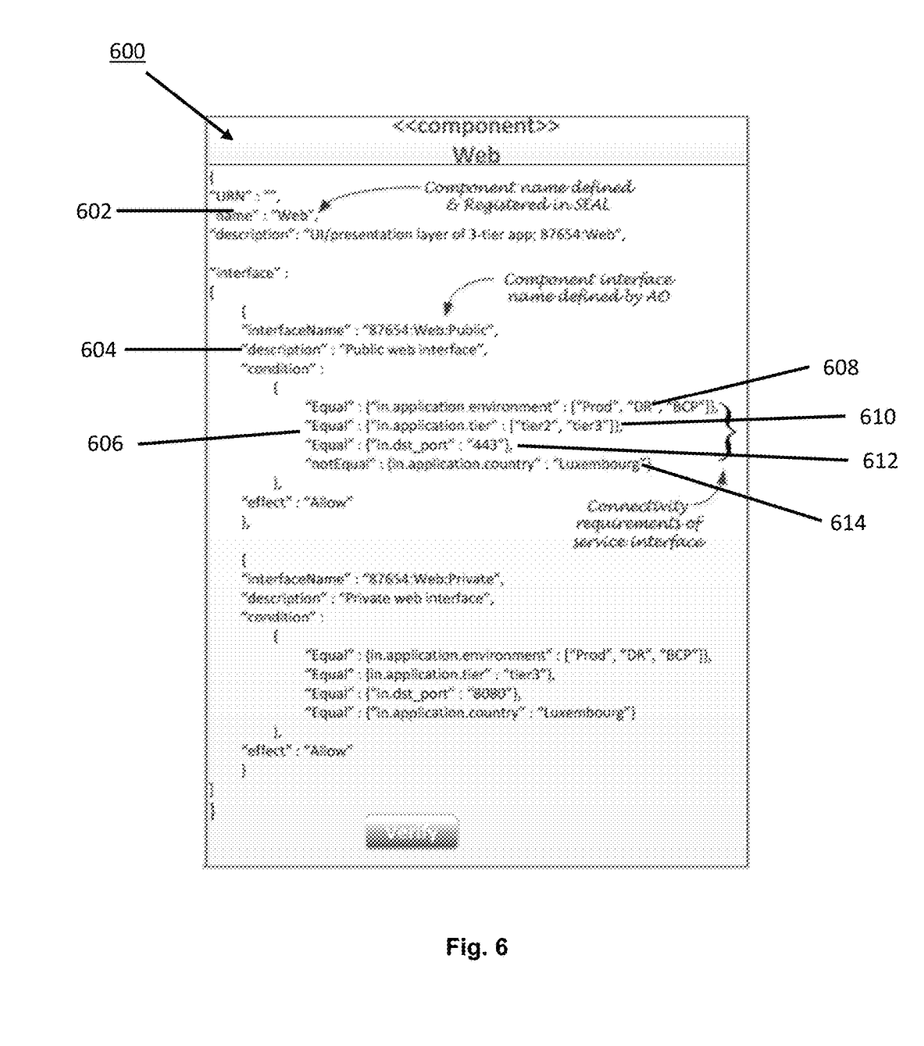
FIG. 6 is a listing of computer code illustrating metadata that functions to control interconnections, according to an exemplary embodiment.

Metadata 600, for an exemplary web interface component, is illustrated in FIG. 6. As shown, the metadata 600 comprises a definition of the web interface component name 602, a component interface name 604, and conditions 606 that are required in order to allow communications by the application. Thus, as illustrated, the application with which this metadata is associated can communicate only with applications in certain environments 608, certain tiers 610, certain communications ports 612, and certain locations 614 (in the illustrated exemplary embodiment, excluding the location "Luexmbourg").

Figure 7:
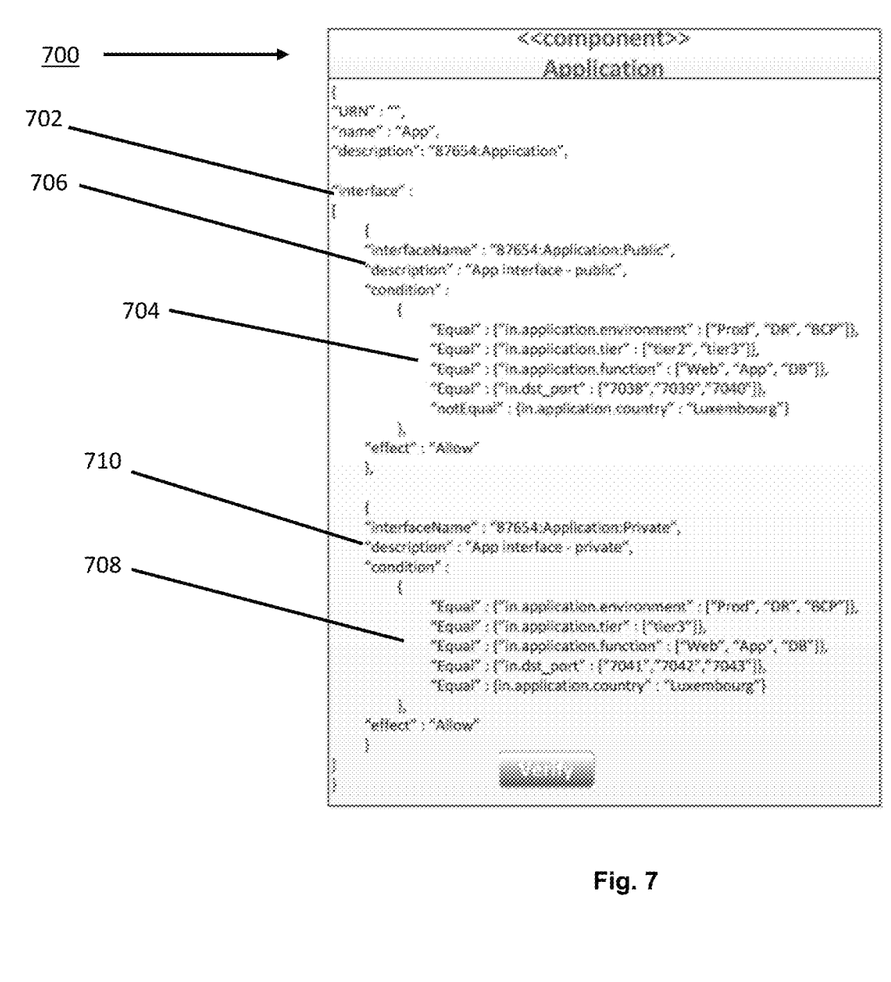
FIG. 7 is a listing of computer code illustrating metadata that functions to control interconnections, according to an exemplary embodiment.

FIG. 7 illustrates another exemplary embodiment in which metadata 700 is provided to define the interface characteristics of an application program. As is shown, an interface 702 is identified which comprises a first set of conditions 704 which are used to define an allowed state with regard to data flowing to and from the application. In the illustrated exemplary embodiment, two interfaces are identified. The first is defined as a public interface 706, but the second set of conditions 708 is associated with a private interface 710. In this manner, the application owner (e.g., the application owner 202) can establish various interfaces with different conditions and thus regulate the information provided to (or accessed by) various applications according to their characteristics and needs.

Figure 8:
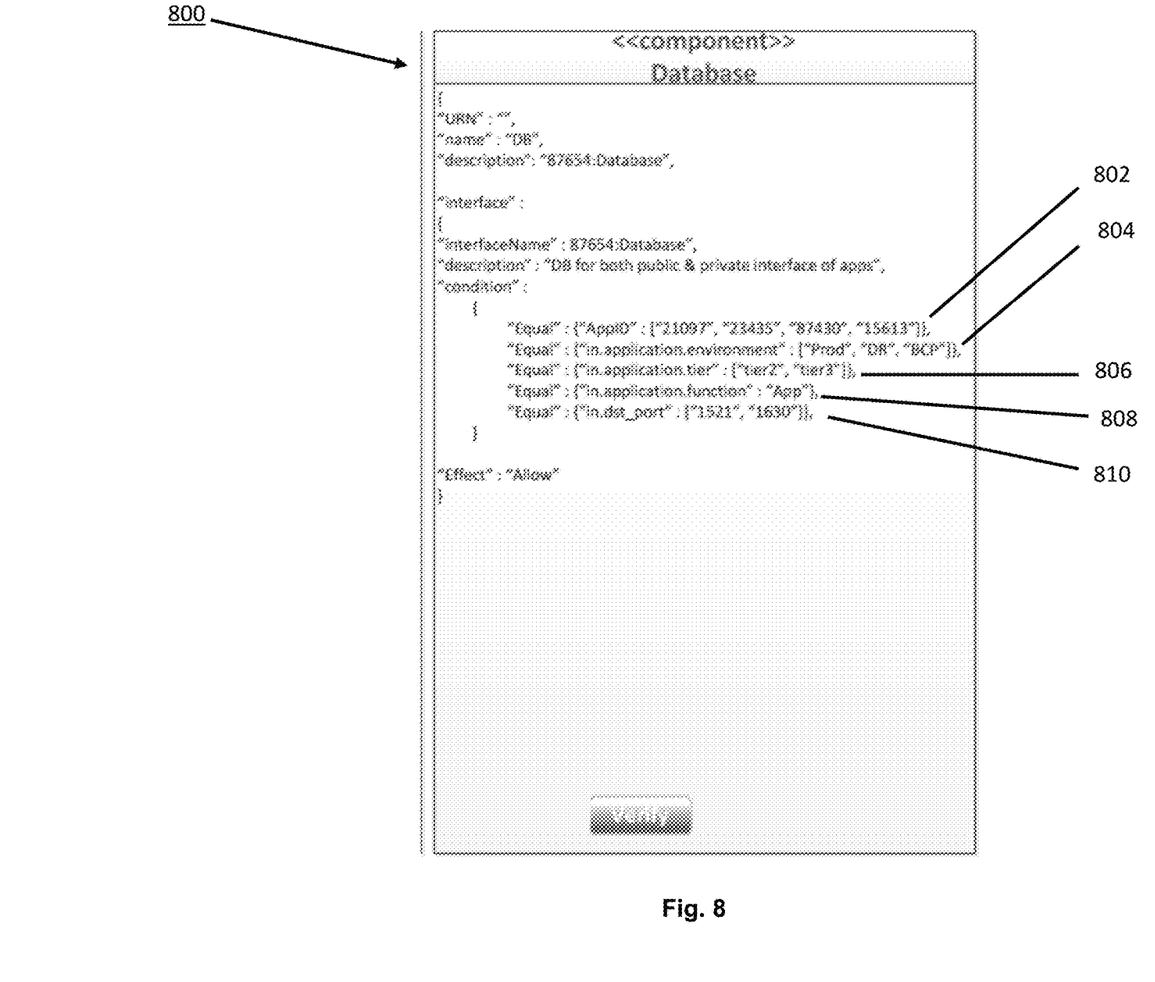
FIG. 8 is a listing of computer code illustrating metadata that functions to control interconnections, according to an exemplary embodiment.

FIG. 8 illustrates another exemplary embodiment of metadata 800 that is associated with a database of information. As illustrated, the metadata 800 defines the limitations on the access to and the use of the database according to a list of specific applications 802, the environment in which the application is operating 804, the tier 806 of the application which is doing the accessing, the function of the application 808, and the port 810 through which the application is attempting to interface the data.

Figure 9:
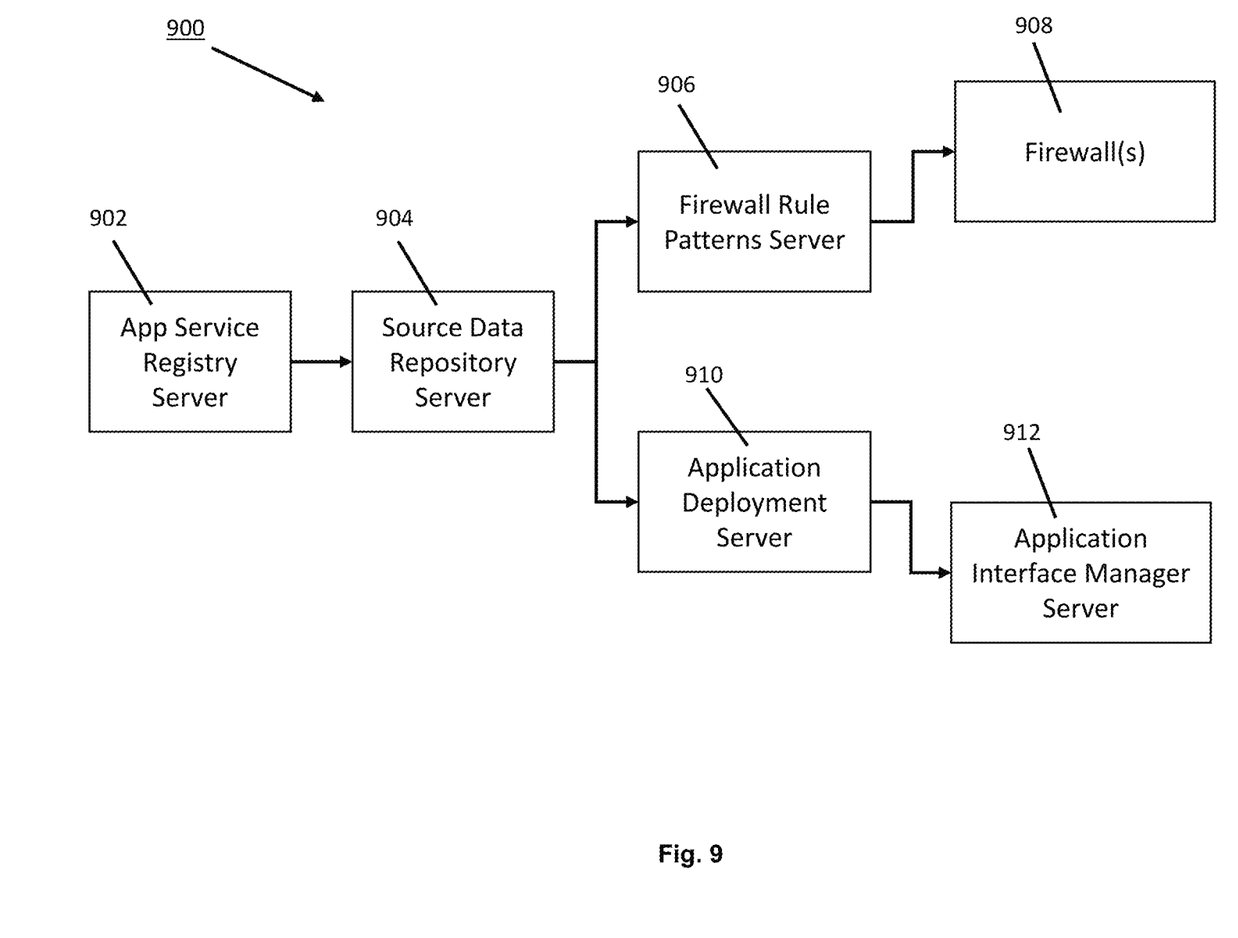
FIG. 9 is a diagram illustrating an exemplary system that performs the functions illustrated in FIG. 2.

FIG. 2 illustrated a data flow from an application owner 202 through various functions to arrive at configuration and control information used for firewall enforcement settings 228 and also to manage an application interface manager 242 that manages the interface connections between an application and various external systems and data sources 244. In certain exemplary embodiments, these functions can be performed by computerized devices such as computer servers. In some exemplary embodiments, computer servers are comprised of processors, memory and software instructions that configure the processors to perform certain desired functions. An exemplary embodiment of the main functions illustrated in FIG. 2 is shown in FIG. 9 as a connection diagram 900 of computer servers. As shown, the application service registry (e.g., the application service registry 204) is formed from a computer server 902. The application service registry is in communication with a source data repository (e.g., the source data repository 222), which is also formed from a computer server 904. The application service registry communicates with a firewall rules pattern manager (e.g., the firewall rules pattern manager 224) whose functions are performed by a computer server 906. The server 906 communicates with one or more firewalls 908 which themselves can be formed from one or more servers. The source data repository communicates connection and data flow information to an ADM (e.g., the ADM 230) which is formed from a computer server 910. This computer server 910 then provides application interface data to an application interface manager (e.g., the application interface manager 242) which can be formed from one or more servers 912. In the illustrated exemplary embodiment, each function is performed in a separate computer server, however, it will be understood that these servers can be combined into a lesser number of computers or certain functions can be divided between more than one such server. Such functions can be consolidated or can be distributed across an organization as is appropriate. As noted, each server executes software instructions that cause the processor of the server to perform the steps necessary to perform the operations of each function from FIG. 2.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A method of controlling data connections of an application program, the method comprising:
   establishing a service definition for the application program corresponding to an application development phase;
   establishing definitions of allowed connections;

storing the service definition and the definitions of allowed connections in an application service registry;

embedding the definitions of allowed connections as metadata into a source code for the application program;

automatically deriving firewall rules from the metadata by,
identifying a plurality of communication endpoints, the plurality of communication endpoints including the application program;
extracting the metadata corresponding to each of the plurality of communication endpoints; and
determining whether a connection between each of the plurality of communication endpoints is permitted based on a comparison of the extracted metadata;

automatically deriving an allowed application data listing from the metadata; and configuring an application interface manager using the allowed application data listing.

2. The method of claim 1, wherein the definitions of allowed connections are also embedded as metadata in a corresponding application program.

3. The method of claim 2, further comprising creating a definition of data publications and data sources and wherein a databook is created that comprises definitions of critical data elements and data sourcing rules derived from the definition of data publications and data sources.

4. The method of claim 1, wherein the step of establishing definitions of allowed connections comprises identifying application types to which an application program is permitted to communicate.

5. The method of claim 1, wherein the step of establishing definitions of allowed connections comprises identifying application environments to which the application program is permitted to communicate.

6. The method of claim 1, wherein the step of establishing definitions of allowed connections comprises identifying ports through which the application program is permitted to communicate.

7. The method of claim 1, wherein the step of establishing definitions of allowed connections comprises defining geographic locations with which the application program is permitted to communicate.

8. The method of claim 1, wherein the step of establishing definitions of allowed connections comprises defining at least one data type from among an environmental variable, a location variable, a confidentiality variable, and a regulatory and compliance variable that may be communicated from the application program.

9. The method of claim 1, further comprising the steps of:
comparing an attempt to access a connection by an application program running in a test environment with the definitions of allowed connections; and
recording each attempt to access a connection that is not included in the definition of allowed connections.

10. A system for automatically regulating data connections of an application program, the system comprising:
an application service registry;
a source data repository in communication with the application service registry;
the application service registry comprising software instructions that when executed by a first processor cause the first processor to:
extract metadata information pertaining to permitted application data connections;
the source data repository comprising software instructions that when executed by a second processor, cause the second processor to:
establish a software application requirements definition for the application program corresponding to an application development phase, the software application requirements definition comprises allowed connections with other applications and data sources;
store the definitions of allowed connections to a metadata document;
embed the definitions of allowed connections as metadata into a source code for the application program;
automatically establish firewall rules from the metadata to,
identify a plurality of communication endpoints, the plurality of communication endpoints including the application program;
extract the metadata corresponding to each of the plurality of communication endpoints; and
determine whether a connection between each of the plurality of communication endpoints is permitted based on a comparison of the extracted metadata;
automatically establish an allowed application data listing from the metadata; and
configure an application interface manager using the allowed application data listing.

11. The system of claim 10, further comprising software instructions that cause the second processor to create a definition of data publications and data sources.

12. The system of claim 10, further comprising software instructions that cause the second processor to create a databook that comprises definitions of critical data elements and data sourcing rules derived from the definition of data publications and data sources.

13. The system of claim 10, wherein the step of establishing a software application requirements definition further comprises identifying allowed connections with other applications and data sources.

14. The system of claim 10, wherein the step of establishing a software application requirements definition further comprises identifying application environments to which the application program is permitted to communicate.

15. The system of claim 10, wherein the step of establishing a software application requirements definition further comprises defining ports through which the application program is permitted to communicate.

16. The system of claim 10, wherein the step of establishing a software application requirements definition further comprises defining geographic locations from which the application program is permitted to communicate.

17. The system of claim 10, wherein the step of establishing a software application requirements definition further comprises defining at least one data type from among an environmental variable, a location variable, a confidentiality variable, and a regulatory and compliance variable that may be communicated from the application program.

18. The system of claim 10, further comprising an application interface manager, the application interface manager comprising software instructions that when executed by the application interface manager cause the application interface manager to:
compare an attempt to access a connection by an application program running in a test environment with the definitions of allowed connections; and record access attempts to connections that are not including in the definition of allowed connections.

\* \* \* \* \*